June 30, 1964 N. L. STAUFFER 3,139,529
INFRARED DETECTION APPARATUS WITH MEANS TO EXPOSE
A CONSTANT AREA OF THE CHOPPER TO THE DETECTOR
Filed March 28, 1961 4 Sheets-Sheet 1
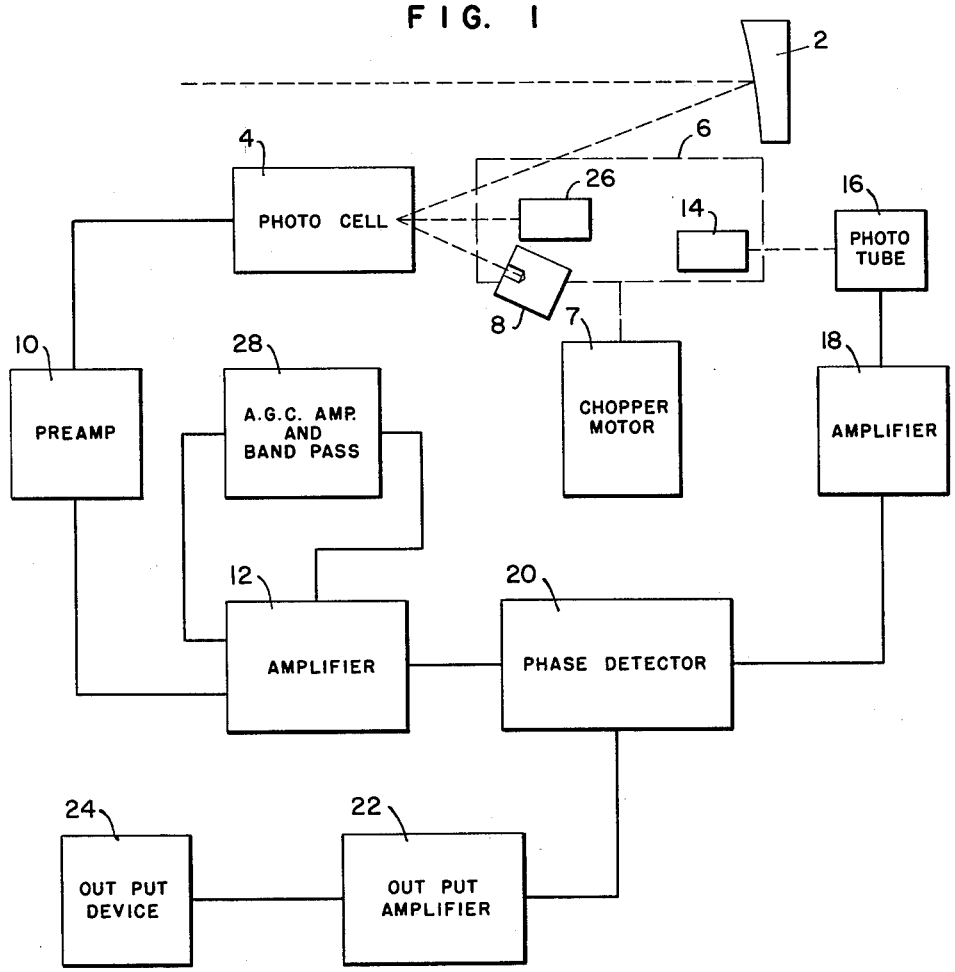
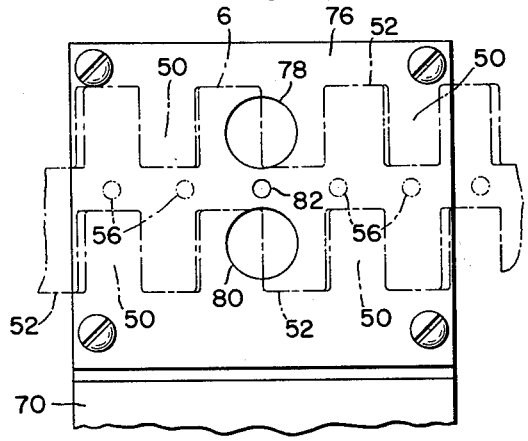
INVENTOR.
NORMAN L. STAUFFER
BY
ATTORNEY.

June 30, 1964   N. L. STAUFFER   3,139,529
INFRARED DETECTION APPARATUS WITH MEANS TO EXPOSE
A CONSTANT AREA OF THE CHOPPER TO THE DETECTOR
Filed March 28, 1961   4 Sheets-Sheet 2

*INVENTOR.*
NORMAN L. STAUFFER
BY
ATTORNEY.

INVENTOR.
NORMAN L. STAUFFER

INVENTOR.
NORMAN L. STAUFFER
ATTORNEY.

United States Patent Office 3,139,529
Patented June 30, 1964

3,139,529
INFRARED DETECTION APPARATUS WITH MEANS TO EXPOSE A CONSTANT AREA OF THE CHOPPER TO THE DETECTOR
Norman L. Stauffer, Denver, Colo., assignor to Minneapolis-Honeywell Regulator Company, Minneapolis, Minn., a corporation of Delaware
Filed Mar. 28, 1961, Ser. No. 98,855
7 Claims. (Cl. 250—83.3)

This invention relates to electronic apparatus, and more particularly to radiation detection apparatus with particular emphasis on radiation in the infrared band.

Heretofore there have been provided many and varied types of radiation detectors known as radiometers, particularly those adapted to quantitatively measure infrared radiation. One function of such detectors is to provide means for indicating the temperature of an article, surface or material without physically engaging the object. In many instances, the previously presented detectors or radiation pyrometers provide excellent service. In other instances, the previous detectors have fallen short because the conditions for detection are not within the acceptable ranges of the devices. For example, the temperature of the target or substance being tested may be too low to provide a recognizable response in the previous detectors. Again, the rate of change of temperature of the matter under test may be more rapid than the previous detectors can follow. Further, some of the previous detector devices do not provide adequate resolution characteristics to permit their use where relatively high resolution is required to scan small target areas. Still further, the time allotted for each measurement may be less than the response time characteristic of the previous devices.

Accordingly, it is an object of the present invention to provide an improved radiation detector which obviates the foregoing deficiencies.

It is another object of this invention to provide an improved infrared radiation measuring device which is capable of measuring the radiation from low temperature objects relatively rapidly.

It is a further object of this invention to provide an improved signal modulator suitable for use in infrared radiation detectors of the type set forth.

It is yet another object of the present invention to provide an improved infrared radiation detector which exhibits a significant response to a wide range of input signal intensities.

A still further object of this invention is to provide an improved radiation sensing device which is characterized in simplicity of structure and operation.

In accomplishing these and other objects, there has been provided, in accordance with the present invention, a radiation detecting apparatus wherein radiation emanating from a target area is collected by a focusing reflector and directed to a radiation-sensitive detector cell. Interposed between the reflector and the cell is a radiation chopper or shutter which is so characterized that radiation from the reflector and from a reference source are alternately applied to the detector while a constant area of shutter surface is presented to the detector to avoid the introduction of errors due to changes in radiation from the shutter itself. Means are also provided whereby the output of the apparatus is automatically compensated for changes in sensitivity due to changes in the ambient temperature.

A better understanding of this invention may be had from the following detailed description when read in connection with the accompanying drawings, in which:

FIG. 1 is a schematic block diagram illustrating radiation detecting apparatus constructed in accordance with the present invention.

Figure 2:
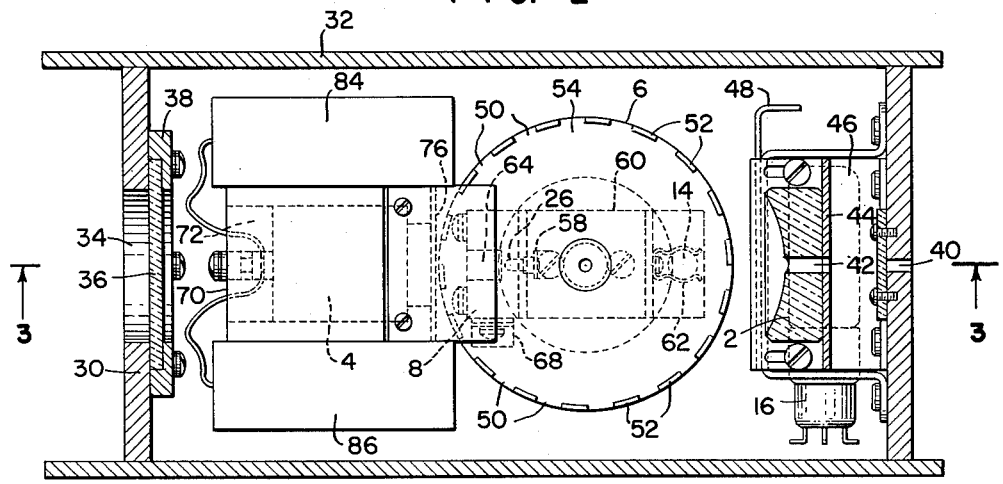
FIG. 2 is a sectional plan view of physical apparatus embodying the present invention the section being taken along the line 2—2 of FIG. 3.
Figure 3:
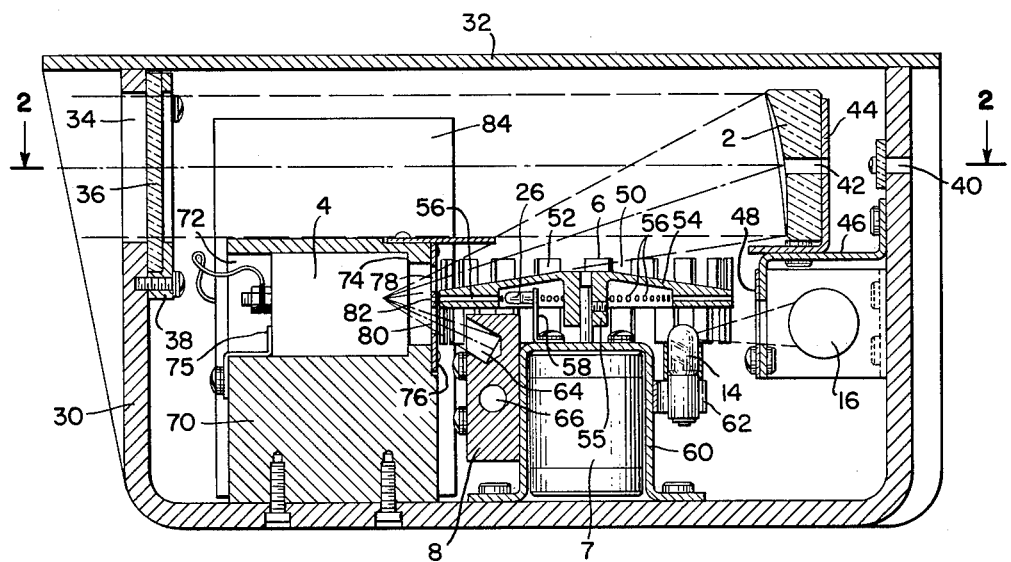
Figure 4:
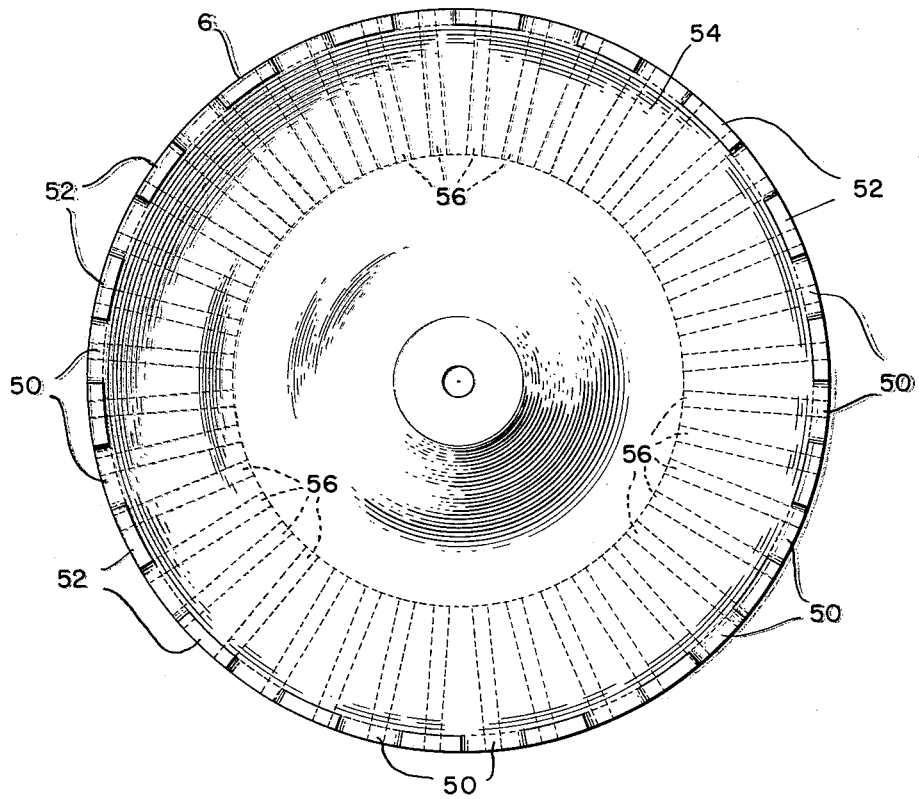
Figure 5:
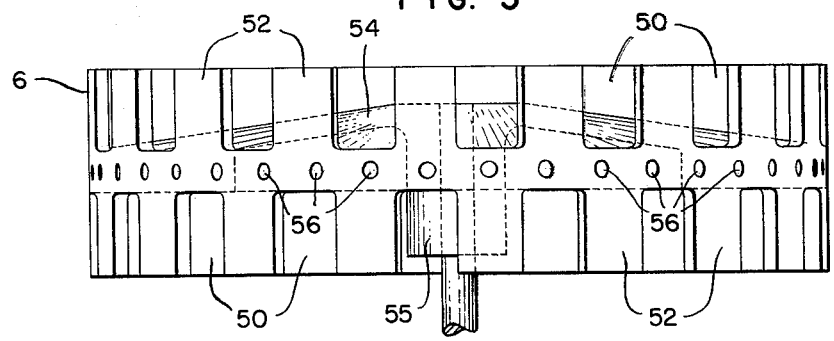
Figure 7:
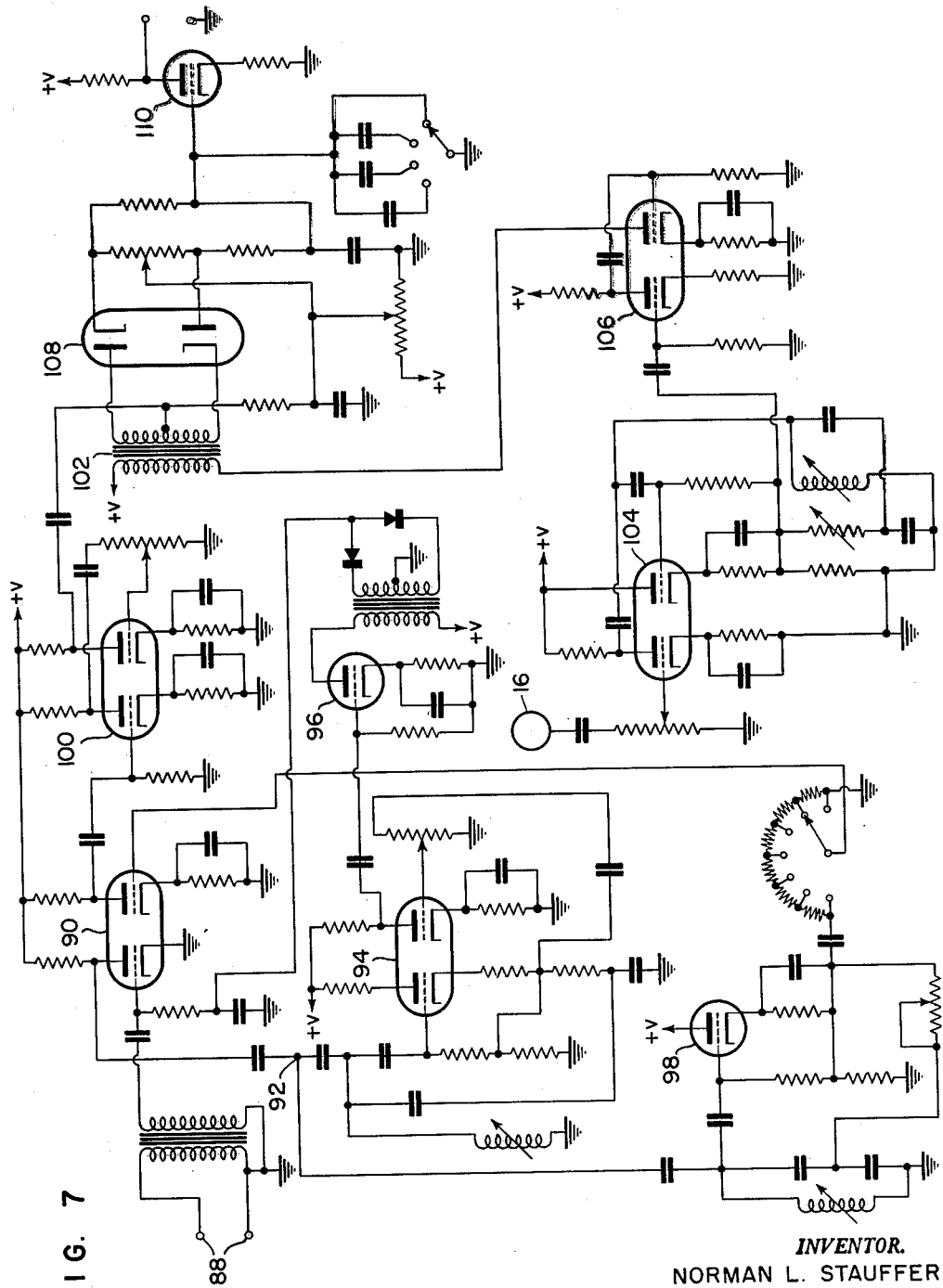

FIG. 3 is a sectional elevation view of the structure shown in FIG. 2, the section being taken along the line 3—3 of FIG. 2, FIGS. 4 and 5 are enlarged plan and elevation views, respectively, of the shutter or chopper shown in situ in FIGS. 2 and 3, FIG. 6 is a detailed view of a portion of the apparatus shown in FIGS. 2 and 3 showing the positioned relationship between the parts, and FIG. 7 is a schematic circuit diagram of a portion of the electronic circuitry represented in block form in FIG. 1.

Referring now to the drawing in more detail, there is shown, in Fig. 1, an overall representation of a system embodying the present invention. Here, incident radiation to be measured is collected by the reflecting surface of a spherical mirror 2. This mirror is oriented with its center of curvature off the axis of the incoming radiation and so tilted that the reflected radiation is directed toward a radiation detector 4 which may be in the form of a so-called P.E.M. cell, or photo electromagnetic cell, such cells being well known in the art. The reflected radiation passing between the mirror 2 and the cell or detector 4 is periodically interrupted or chopped by a drum-chopper 6 driven by a chopper motor 1. This chopper is of special design and is shown in more detail in FIGS. 2 to 5 and will be described more fully in connection with the discussion of those figures hereinafter.

The cell 4 is also exposed to radiation from a constant temperature reference source 8, also described in more detail hereinafter. Radiation from this reference source 8 is also chopped by the chopper 6 in such manner that the cell 4 alternately "looks at" the radiation to be measured and the radiation from the source 8. This produces an alternating signal which is applied as input signal to a preamplifier 10 and from thence to an amplifier 12.

A phase reference signal source 14 is positioned within the cylindrical space defined by the chopper 6 and located diametrically opposite thereof with respect to the sources directing radiation toward the cell 4. This source 14 may be in the form of a small light bulb such as are used frequently as pilot lights. Radiation from this source 14 is directed through the chopper 6 toward a photo-cell 16 which may be a conventional photoelectric tube. The radiation from the source 14, chopped by the chopper, and falling on the phototube 16 produces an alternating electric signal which is applied as input signal to an amplifier 18. The output of the amplifier 18 is applied as one input signal to a phase detector 20. The output of the earlier mentioned amplifier 12 is applied as a second input signal to the phase detector 20 where the two input signals are compared for relative phase. The output of the phase detector 20 is applied as input signal to an output amplifier 22 and from thence to a suitable output device 24 such as an indicator, a recorder or the like.

Inasmuch as the detector cell 4 is or may be sensitive to changes in ambient temperature, that is, it may vary the magnitude of its output signal in response to changes in its own temperature, means are provided for overcoming signal errors which would be introduced thereby. A small constant temperature light source 26, which may be a small incandescent bulb, is positioned within the cylindrical space defined by the chopper 6 adjacent the reference source 8. Light from this source 26 is directed through a plurality of small apertures in the chopper drum 6 onto the detector cell 4 in such manner, as will be explained more fully hereinafter, as to produce a separately indentifiable signal. Preferably the signal thus produced is of a higher frequency than that of the intelligence signal previously discussed and is superimposed upon that signal and applied to the input of the pre-amplifier 10. In the amplifier 12 the higher frequency signal is separated from the intelligence signal, fed through a band-pass amplifier 28 then back to control the gain of the amplifier 12 in accordance with whatever changes may occur in the magnitude of that signal. Since the source 26 is held at a constant temperature, the only element subject to variation which could cause significant differences in the magnitude of this gain control signal would be the detector cell 4, itself. Since the change in the magnitude is a direct function of the change in operating characteristic of the cell 4, the corresponding changes in the gain of the amplifier 12 produces the effect of neutralizing these unwanted deviations.

Reference may now be had to FIGS. 2 to 6 where the several items discussed thus far are shown in a typical embodiment. The elements are mounted in a lower case member 30 which also serves as a chassis for the structure. This member is formed with a flat bottom and upturned ends, thereby forming a bottom and two end walls of a housing for the apparatus. An upper case member 32 is formed complementary to the member 30, having a relatively flat top and down-turned sides forming a top and two integral side walls, thus completing the housing for the apparatus. The member 32 is made somewhat longer than the lower member 30 to provide a measure of mechanical protection to the several openings in the two end walls of the lower member 30.

One such opening is the aperture 34 through which the radiation to be measured is admitted to the interior of the housing. This aperture 34 is covered by a lens or window 36 mounted on the inner side of the end wall and held in place by a suitable retainer 38. This window is preferably made of a suitable selective radiation transmitting material. In the case of infrared radiation, the window 36 may well be made of arsenic-trisulfide which has excellent transmitting characteristics in the desired infrared range.

Directly opposite that window and coaxial therewith is another opening or aperture 40 through the opposite end wall. The opening 40 is a "peep" hole by means of which the apparatus may be aimed at the target area of the object being measured. The mirror 2, too, has a small hole 42 through it which is also coaxial with the window 36 and the peep hole 40, permitting a line-of-sight through the apparatus which is coincident with the optical axis of the instrument.

The mirror 2 is a spherical, front-surface reflection mirror having its center of curvature off of the optical axis of the instrument and so oriented that the incoming radiation to be measured is reflected onto the detector cell 4 as aforementioned. The mirror 2 is mounted on a bracket 44 which is, in turn, carried by a housing member 46 for the phototube 16. The face of the housing member 46 is adjacent the chopper 6 has a horizontally elongated aperture therethrough to permit light from the phase reference source 14 to fall on the phototube 16 within the housing. An adjustable aperture plate 48 is carried by the apertured face of the housing member 46. The aperture in the plate 48 is somewhat smaller than the aperture in the housing member 46. The plate, itself, is horizontally adjustable relative to the housing member. This adjustment permits a shift in the phase of the alternating signal developed by the phototube 16, as a result of the chopping of the light from the source 14 by the chopper 6, with respect to the alternating signal developed by the detector cell 4. The purpose of this adjustment will appear hereinafter.

The chopper 6, to which reference has been made, is in the form of a double-crenelated cylinder. That is, with the axis of the cylinder oriented vertically, both the upper and the lower edges of the cylinder are crenelated. Further, the crenels 50 are uniformly spaced about the circumference of the cylinder with the merlons 52 between the crenels being equal to the width of the crenels. Additionally, the crenels 50 along the upper edge of the cylinder are in substantially exact axial alignment with the lower merlons 52, and vice versa. The cylindrical portion of the chopper structure is supported by a radial web portion 54 which has a central hub 55 for attachment to the shaft of the chopper motor 7. The web portion 54 is convex upwardly or crowned high in the center near the hub. The outer portion of the web is or may be integral with the cylindrical portion of the chopper and joined thereto at the middle; that is, approximately midway between the two crenelated ends. A number of ports or openings 56 extending radially about the chopper cylinder are provided to permit radiation to pass from the source member 26, through these ports 56 to the detector cell 4. The convex contouring of the web portion 54 provides means whereby the light bulb or source member 26 may be mounted in a position to radiate through the row of ports, located centrally between the two rows of crenels, toward the cell 4. Thus the lamp 26 is shown mounted on a bracket 58 which is, in turn, mounted on a magnetic shield housing 60 for the motor 7. A second bracket 62 on the motor housing 60 carries the phase reference source lamp 14.

Opposite from the bracket 62, and also mounted on the motor housing 60 is the constant temperature reference source 8, earlier referred to. The reference source member 8 includes a metal block, preferably aluminum, which has a cavity 64 formed therein. A heater-resistance is embedded in the block as a means of heating the block to the desired temperature, which may, for example, be 120° F. A small thermostat 68 is secured to the side of the block 8 and serves to control the temperature thereof. The block, itself, including the interior of the cavity 64 is preferably anodized black to approximate a black-body radiation condition. The cavity 64 is formed at such an angle that the detector cell 4 "looks" into the cavity through the lower half of the chopper 6.

The detector cell 4 is mounted in a temperature stabilizing block or heat sink 70 which is secured to the lower case member 30. The block 70 has a recess 72 formed therein of a dimension to receive the detector cell 4. A peripheral shoulder 74 about the recess 72 limits the forward positioning of the cell 4 while a clamp 75 presses against the rear of the cell 4, holding it securely in position. Bridging the front opening of the recess 72, defined by the edge of the shoulder 74, there is an aperture plate 76. That plate is shown in position in FIGS. 2 and 3 and in substantial detail in FIG. 6. The plate 76 is provided with a first large opening or aperture 78 which is located to cooperate with the upper crenelated edge of the chopper 6, controlling the radiation falling on the detector cell 4 from the mirror 2. A second and similar opening or aperture 80 is also provided in the plate 76. The second aperture 80 is located below the first aperture and positioned to cooperate with the lower crenelated edge of the chopper to control the radiation falling on the detector cell 4 from the reference source 8. A third and smaller aperture 82 is provided through the plate 76 and located between the two larger apertures and in position to cooperate with the ports 56 in the chopper drum whereby to control the light falling on the cell 4 from the gain control reference source 26. The curvature of the mirror 2 and the relative spacing between the mirror 2 and the surface of the active element in the detector cell 4, contributes to determining the resolution of the sensing apparatus. In one structure constructed in accordance with this invention, the parameters were such that the apparatus viewed an area of about one inch square at a distance of six feet from the face of the apparatus.

On each side of the block 70 there is positioned a housing member 84 and 86, respectively, for the electronic circuitry immediately associated with the apparatus. For example the housing members 84 and 86 may contain the preamplifier 10 which may be a small transistorized amplifier.

Previous devices for measuring the temperature of surfaces by radiation detection means have included the alternate exposure of the detector element to the target area to be measured and a reference source. However this function is most frequently accomplished by the use of a chopper or shutter mechanism which serves to alternately pass the radiation to be measured to the cell, then to interrupt that radiation and serve as a reflector for a reference source. That arrangement introduces the possibility, or even the probability, of developing erroneous output signals due to variations in the temperature of the shutter blades themselves, in view of the alternate interposition of the blades of the shutter in the field of view of the detector. In such arrangements the shutter temperature is superimposed only on one of the signals sensed by the detector thus producing a differential signal which would vary whenever the temperature of the shutter varied. Since the shutter is a rotating or otherwise movable element, it would be very difficult, at best, to stabilize the temperature. The novel structure provided in accordance with the present invention avoids the introduction of such errors due to the variations in the temperature of the shutter. The structure herein disclosed subjects the detector cell 4 to exposure to a constant area of the surface of the chopper 6. In FIG. 6, the aperture plate 76 is illustrated with a portion of the chopper 4 superimposed, in phantom line, thereon to show the relative positioning of the elements. In considering this view, it may be seen that, in the position shown, the left half of the upper aperture 78 "looks at" a portion of the upper crenels 50 of the chopper drum 4 while the right half of the lower aperture 80 "looks at" a portion of one of the lower crenels of the chopper drum. It may further be seen that as the drum rotates, say to the right as viewed in FIG. 6, a larger portion of the aperture 78 will be obscured by and exposed to the surface of the chopper. At the same time and by the same amount, the lower aperture 80 "sees" a smaller portion of the surface of the chopper. This continues until the upper aperture is completely obscured by the chopper and the lower aperture is completely opened. Then as the chopper continues to rotate, the upper aperture begins to be opened and the lower one begins to be obscured. Since both apertures lead to the same detector cell, it may be seen that, with the present apparatus, the sum of the areas of the chopper surface seen by the cell 4 through the two large apertures 78 and 80 remains constant, irrespective of the instantaneous position of the chopper 6 relative to the aperture plate 76. Since the signal developed by the cell 4 is an alternating signal representing the difference in the temperature of the target area and the reference source, the superimposition of the chopper temperature equally on both of these references results in no error in the difference signal. Thus this source of error, to which the previous devices were subject, has been avoided.

Again referring to the chopper drum 6, as illustrated, the drum is provided with means which would develop eighteen alternations of the signal on the detector cell 4 per revolution of the drum. The ports 56, through which the light for generating a gain control signal passes, are forty in number, in the illustrative embodiment. If the drum is rotated at say about three thousand revolutions per minute, the intelligence will appear at about nine hundred cycles per second while the gain control signal would appear at about two thousand cycles per second. While these values are exemplary, they are not intended to be limiting. This frequency difference may be readily separated, in the electronic amplifier portions of the apparatus, as previously noted.

The output signals from the detector cell 4 are, as indicated in the discussion of FIG. 1, applied to a preamplifier where the combined intelligence and gain control signals are amplified. As hereinbefore noted, the preamplifier 10 may be a more-or-less conventional transistor amplifier and is not illustrated in detail. In order to illustrate, more fully, suitable circuitry for accomplishing the desired operation of the instant apparatus, representative circuitry is schematically illustrated in FIG. 7.

Output signals from the preamplifier 10 are applied as input signals to the terminals 88 which are transformer coupled to the input of a first amplifier tube 90. As illustrated, the tube 90 is shown as a dual-triode with the input signal being applied to the first section thereof. The output from the first half of the tube 90 is taken at the anode thereof and fed to a junction 92. From the junction 92 the signal is divided, by a pair of tuned circuits, to separate the intelligence signal from the higher frequency gain control signal. The latter or gain control signal is amplified by a dual-triode amplifier stage 94, thence to a single stage amplifier 96. The output of the stage 96 is rectified and fed back to the input of the first section of the tube 90 to change the bias on the grid thereof, thereby controlling the gain of that stage in accordance with the magnitude of the gain control signal.

Also from the junction 92, the intelligence portion of the signal is applied to a suitably tuned amplifier stage 98 and from thence to the input of the second half of the tube 90. The intelligence signal is further amplified by the two stages of a further dual-triode tube 100. The output of that tube 100 is fed to the center tap of the secondary winding of a phase detector transformer 102.

The signals developed by the operation of the phase reference source 14, the chopper 6, and the phototube 16 are, as was previously mentioned, of a frequency which is the same as that of the chopped intelligence signal, being derived from the same chopper. The adjustable aperture plate 48 associated with the phototube 16 permits the phase of the phase reference signal to be made substantially exactly coincident with the chopped intelligence signal developed in the detector cell 4. The phase reference signal developed in the phototube 16 is amplified, first, by the two sections of a dual-triode tube 104, the second portion of which is connected as a cathode-follower, thence to a second dual-triode tube 106. The output of that tube 106 is applied as a reference source to the primary winding of the transformer 102.

The extreme ends of the secondary winding of the transformer are connected, respectively, to the anode of one diode rectifier and the cathode of another, there rectifiers being represented by a dual-diode tube 108. This arrangement provides what is often called a synchronous demodulator. The original input signal was modulated by the chopper and compared with the signal from the reference source 8 which, it will be recalled, was maintained at a constant temperature of say 120° F. The detector cell 4 recognizes only a difference in temperature of the two sources, it cannot tell which one is greater. However, with the synchronous demodulation action, so long as the temperature to be measured is larger than that of the reference source, the phase relation of the signals at the phase sensitive demodulator 20 will produce an output direct current signal of positive polarity. If, on the other hand, the temperature to be measured is smaller than that of the reference source 8, the phase relationship of the signals at the demodulator 20 is reversed, and the output is a direct current signal of opposite or negative polarity. In either case, the magnitude of the output signal will be proportional to the magnitude of the difference in temperature between the target area and the reference source.

The demodulated signal from the phase detector 20 is applied, through suitable selective filtering, to the output amplifier 22 represented by the tube 110.

The selective filtering feature adapts the system to a variety of situations where the time response of the system may be varied to meet desired conditions of speed of output response and tolerable noise signal. The heavier the filtering, the less will be the noise content of the output signal but at the same time the slower will be the response time. This relationship is, of course, particularly noticeable in the lower target temperature ranges. The apparatus herein described has provided means whereby improved results are obtainable which maintaining a rapid response time even at relatively low temperatures of the object.

Thus it may be seen that there has been provided, in accordance with the present invention, an improved radiation detecting and measuring apparatus which is characterized in its rapid response to a wide range of input temperature signals, including very low temperatures, and the fineness of its target area resolution. It is further characterized in its freedom from errors ordinarily incident to variations in ambient temperature, freedom from the effect of such ambient temperature variations either on the detector cell itself or on the signal modulating chopper.

What is claimed is:

1. A radiometer comprising, in combination, a radiation detector cell, optical means for receiving and focusing radiation to be measured onto said detector cell, a source of reference radiation positioned to direct radiation therefrom onto said detector cell for comparison with said radiation from said optical means, chopper means for intermittently and alternately interrupting the flow of radiation from said optical means and from said reference source toward said detector cell, said chopper means being characterized in that a substantially constant area of the surface of said chopper is exposed to said detector cell during operation of said chopper, and means for compensating said radiometer for change in the sensitivity of said detector cell.

2. A radiometer comprising a radiation detector cell, optical means for receiving and focusing radiation to be measured onto said detector cell, a source of reference positioned to direct radiation therefrom onto said detector cell for comparison with said radiation from said optical means, means defining a first and a second aperture, said first aperture being oriented in the path of the radiation between said optical means and said detector cell, said second aperture being oriented in the path of the radiation between said reference source and said detector cell, a rotatable chopper means for intermittently and alternately interrupting the flow of radiation through said apertures toward said detector cell, said chopper comprising a double crenelated cylindrical body having alternate merlons and crenels along opposite ends of said cylindrical body with the merlons at one end in alignment with the crenels of the opposite end, the crenels and merlons of one end being positioned to intermittently interrupt the radiation flowing through one of said apertures and the crenels and merlons of the opposite end being positioned to intermittently interrupt the radiation flowing through the other of said apertures, said positioning of said chopper means relative to said apertures constituting means whereby a substantially constant area of the surface of said chopper means is exposed to said detector cell during operation of said chopper.

3. A radiometer comprising a radiation detector cell, optical means for receiving and focusing radiation to be measured onto said detector cell, a source of reference radiation positioned to direct radiation therefrom onto said detector cell for comparison with said radiation from said optical means, means defining a first and a second aperture, said first aperture being oriented in the path of radiation between said optical means and said detector cell, said second aperture being oriented in the path of the radiation between said reference source and said detector cell, a rotatable chopper means for intermittently and alternately interrupting the flow of radiation through said apertures toward said detector cell, said chopper comprising a double crenelated cylindrical body having alternate merlons and crenels along opposite ends of said cylindrical body with the merlons at one end in axial alignment with the crenels at the opposite end, the crenels and merlons of one end being arranged to intermittently interrupt the radiation flowing through one of said apertures and the merlons and crenels of the opposite being arranged to intermittently interrupt the radiation flowing through the other of said apertures, said arrangement of said chopper means relative to said apertures constituting means whereby a substantially constant area of the surface of said chopper means is exposed to said detector cell during operation of said chopper, and means for compensating said radiometer for changes in said detector cell.

4. A radiometer comprising, in combination, a radiation detector cell, optical means for receiving and focusing radiation to be measured onto said detector cell, a source of reference radiation positioned to direct radiation therefrom onto said detector cell for comparison with said radiation from said optical means, chopper means for intermittently and alternately interrupting the flow of radiation from said optical means and from said reference source toward said detector cell to produce from said cell a first alternating electrical signal of predetermined frequency and representative of the radiation to be measured, means for producing in said cell a second alternating electrical signal of a second and separately identifiable frequency and being representative of the operating condition of said cell, and means responsive to said second electrical signal for compensating said radiometer for changes in the sensitivity of said detector cell.

5. A radiometer comprising, in combination, a radiation detector cell, optical means for receiving and focusing radiation to be measured onto said detector cell, a first source of reference radiation positioned to direct radiation therefrom onto said detector cell for comparison with said radiation from said optical means, chopper means for intermittently and alternately interrupting the flow of radiation from said optical means and from said reference source toward said detector cell to produce from said cell a first alternating electrical signal of predetermined frequency and representative of the radiation to be measured, a second source of reference radiation positioned to direct radiation therefrom onto said detector cell, means including said chopper means for intermittently interrupting said radiation from said second source to produce from said cell a second alternating electrical signal of a second and separately identifiable frequency and being representative of the operating condition of said cell, and means responsive to said second electrical signal for automatically compensating said radiometer for changes in the sensitivity of said detector cell.

6. A radiometer comprising a radiation detector cell, optical means for receiving and focusing radiation to be measured onto said detector cell, a first source of reference radiation positioned to direct radiation therefrom onto said detector cell for comparison with said radiation from said optical means, chopper means for intermittently and alternately interrupting the flow of radiation from said optical means and from said reference source toward said detector cell to produce from said cell a first alternating electrical signal of predetermined frequency and representative of the radiation to be measured, a second source of reference radiation positioned to direct radiation therefrom onto said detector cell, means including said chopper means for intermittently interrupting said radiation from said second source to produce from said cell a second alternating electrical signal of a second and separately identifiable frequency and being representative of the operating condition of said cell, said second signal being superimposed upon said first signal, amplifying means for amplifying said superimposed signals, means for separating said second signal from said first signal, and means for applying said second signal to control the gain of said amplifying means in accordance with the magnitude of said second signal whereby to compensate said radiometer for changes in the sensitivity of said detector cell.

7. A radiometer comprising a radiation detector cell, optical means for receiving and focusing radiation to be measured onto said detector cell, a first source of reference radiation positioned to direct radiation therefrom onto said detector cell for comparison with said radiation from said optical means, chopper means for intermittently and alternately interrupting the flow of radiation from said optical means and from said reference source toward said detector cell to produce from said cell a first alternating electrical signal of predetermined frequency and representative of the radiation to be measured, said chopper means being characterized in that a substantially constant area of the surface of said chopper is exposed to said detector cell during operation of said chopper, a second source of reference radiation positioned to direct radiation therefrom onto said detector cell, means including said chopper means for intermittently interrupting said radiation from said second source to produce from said cell a second alternating electrical signal of a second and separately recognizable frequency and being representative of the operating condition of said cell, said second signal being superimposed upon said first signal, amplifying means for amplifying said superimposed signals, means for separating said second signal from said first signal, and means for applying said second signal to control the gain of said amplifying means in accordance with the magnitude of second signal whereby to compensate said radiometer for changes in the sensitivity of said detector cell.

References Cited in the file of this patent

UNITED STATES PATENTS

| | | |
|---|---|---|
| 2,886,970 | Munker | May 19, 1959 |
| 2,963,910 | Astheimer | Dec. 13, 1960 |
| 2,968,946 | Goldberg et al. | Jan. 24, 1961 |